United States Patent Office 2,844,586
Patented July 22, 1958

2,844,586
METHAPYRILENE AND THENFADIL NICOTINATE

Edgar A. Ferguson, Jr., Brooklyn, N. Y.

No Drawing. Application March 15, 1956
Serial No. 571,611

5 Claims. (Cl. 260—294.8)

This invention relates to a new and useful improvement in sedative compositions.

The particular group of sedative compositions herein described is characterized by methapyrilene-nicotinate. The purpose of this invention is to provide a new and useful composition for safe sedation. Another purpose of the description herein is to provide the means for manufacture of the said composition and for the manufacture of at least one related compound known as thenfadil-nicotinate.

Methapyrilene consists of 2-2((2-dimethyl amino ethyl)-2-thenyl amino)-pyridine. Thenfadil consists of 2-((2-dimethyl amino ethyl)-3-thenyl amino)-pyridine. Nicotinic acid consists of pyridine-3-carboxylic acid.

The theory of the formation of the salt, methapyrilene-nicontinate or thenfadil-nicontinate is embodied in the following description. This description of the theory however should not limit the scope of the invention in accordance with the specifications and claims and is not intended to do so. The exposition is for the purpose of better understanding the art of manufacturing and using the composition. In 2-2((2-dimethyl amino ethyl)-2-thenyl amino)-pyridine there is a basic nitrogen in the ring, and two basic nitrogens on the side chain. The nitrogens on the side chains are nitrogens of a tertiary amine. All of these nitrogens are quite basic in character. Such basic nitrogen groups react to form salts. It has been discovered however that the formation will not proceed properly and will not allow the full action of the methapyrilene unless particular derivatives are reacted with 2-2((2-dimethyl amino ethyl)-2-thenyl amino)-pyridine. One of these which it has been found will react in such manner that good sedative action of the resulting compound is obtained is pyridine-3-carboxylic acid. The salt form is the ammonium type of salt not the type of salt formed with the elimination of water. It is rather the ammonium type of salt as is found in the elementary reaction of ammonium groups ($NH_3$) with hydrochloric acid (HCl) to form ammonium chloride ($NH_4Cl$). Thus the salt is formed without condensing out water or any other product. Thus pyridine-3-carboxylic acid reacts with 2-2((2-dimethyl amino ethyl)-2-thenyl amino)-pyridine after the manner of the formation of this ammonium salt as illustrated when the two react mol for mol. One, two, or three mols of pyridine-3-carboxylic acid may react with one mol of 2-2((2-dimethyl amino ethyl)-2-thenyl amino)-pyridine. In a like manner pyridine-3-carboxylic acid can react with 2-((2-dimethyl amino ethyl)-3-thenyl amino)-pyridine in the order of 1 mol of pyridine-3-carboxylic acid to 1 mol 2-((2-dimethyl amino ethyl)-3-thenyl amino)-pyridine, two mols of pyridine-3-carboxylic acid to one of 2-((2-dimethyl amino ethyl)-3-thenyl amino)-pyridine and three mols of pyridine-3-carboxylic acid may react with 1 mol of 2-((2-dimethyl amino ethyl)-3-thenyl amino)-pyridine. What has been said for pyridine-3-carboxylic acid also refers to its 2-pyridine carboxylic isomers.

Pyridine-3-carboxylic acid has an ionization constant in the order of $10^{-5}$ and the pH of a saturated aqueous solution is 2.7. By reason of the relationship of the carboxyl group to the nitrogen of the ring the isomers of pyridine-3-carboxylic acid may have more acidity than pyridine-3-carboxylic acid. However pyridine-3-carboxylic acid is the preferred embodiment of this invention. Thus a co-ordinate-covalent linkage is formed to make a salt. This then is a neutralization-addition reaction.

This linkage is illustrated as follows:

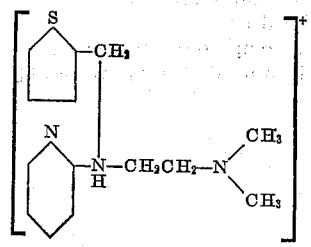

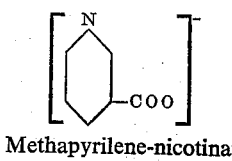

Methapyrilene-nicotinate

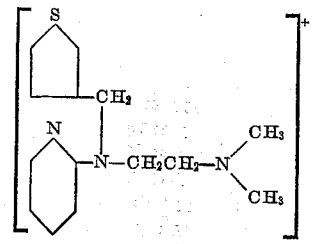

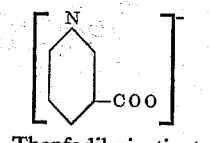

Thenfadil-nicotinate

The following examples are meant to illustrate some of the methods of manufacture and are not presented for any purpose of limiting the scope and spirit of the invention as delineated in the specifications and claims. Other methods will be apparent to one skilled in the art.

Example 1

Take 261 grams of methapyrilene. Add 3600 cc. of water. To this add 121 grams of nicontinic acid. To the resulting reaction mixture add 10% methyl alcohol. Remove the water with vacuum distillation procedures. The resultant product is methapyrilene-nicontinate. Note when nicontinic acid is added it may be necessary to slightly warm the solution under reflux conditions and maintain this warmth at approximately 30° C. while stirring for a period of one hour.

Example 2

To 261 grams of methapyrilene add 300 cc. of water. When slightly warmed (30° C.) add 120 grams of nicotinic acid slowly with stirring. Add 30 cc. of methyl alcohol to this reaction product and place in a vacuum still. The resultant product, after removal of alcohol and water is methapyrilene-nicotinate.

Example 3

Take 261 grams of thenfadil. Add 3600 cc. of water. To this add 121 grams of nicotinic acid. To the resulting reaction mixture add 10% methyl alcohol. Remove the water with vacuum distillation procedures. The resultant product is thenfadil-nicotinate. Note when nicotinic acid is added it may be necessary to slightly warm the solution under reflux conditions and maintain this warmth at approximately 30° C. while stirring for a period of one hour.

*Example 4*

To 261 grams of thenfadil add 300 cc. of water. When slightly warmed (30° C.) add 120 grams of nicotinic acid slowly with stirring. Add 30 cc. of methyl alcohol to this reaction product and place in a vacuum still. The resultant product, after removal of alcohol and water is thenfadil-nicotinate.

What is claimed is:

1. As a new composition of matter, a salt of a substance selected from the group consisting of 2-((2-dimethylamino-ethyl)-2-thenylamino) pyridine and 2-((dimethylamino-ethyl)-3-thenylamino) pyridine and an acid selected from the group consisting of pyridine-2-carboxylic acid and pyridine-3-carboxylic acid.

2. As a new composition of matter, the salt of 1 mol of 2-((2-dimethylamino-ethyl)-2-thenylamino) pyridine and 1 mol of pyridine-3-carboxylic acid.

3. As a new composition of matter, the salt of 1 mol of 2-((2-dimethylamino-ethyl)-2-thenylamino) pyridine and 2 mols of pyridine-3-carboxylic acid.

4. As a new composition of matter, the salt of 1 mol of 2-((2-dimethylamino-ethyl)-3-thenylamino) pyridine and 1 mol of pyridine-3-carboxylic acid.

5. As a new composition of matter, the salt of 1 mol of 2-((2-dimethylamino-ethyl)-3-thenylamino) pyridine and 2 mols of pyridine-3-carboxylic acid.

No references cited.